J. R. RICHARDSON, J. WESTERMAN & E. WILDER.
MACHINE FOR MAKING SPIKES.
No. 9,902. Patented Aug. 2, 1853.
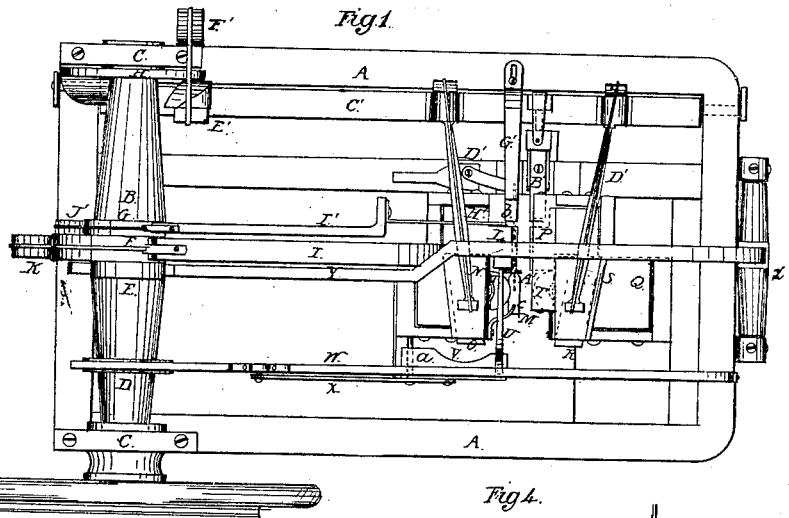
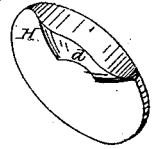
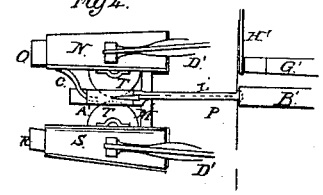
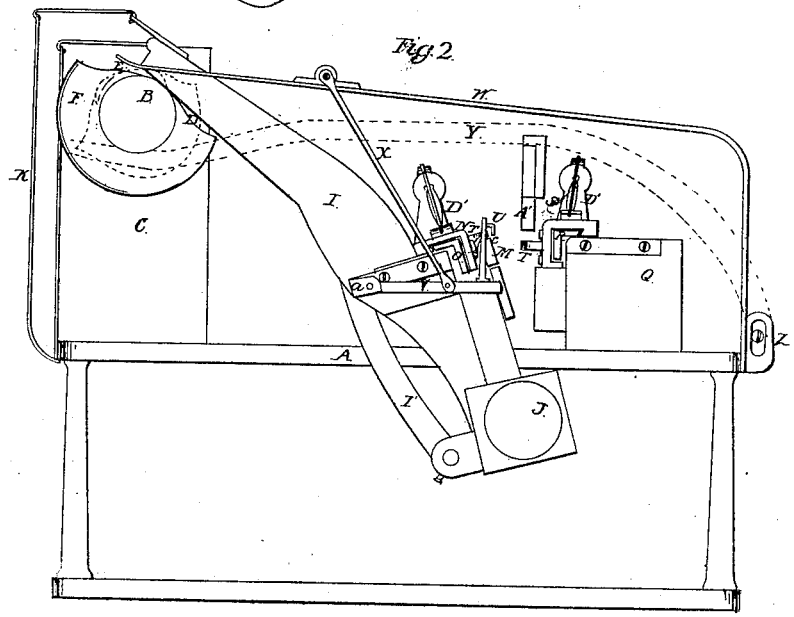

UNITED STATES PATENT OFFICE.

JOHN R. RICHARDSON, JAMES WESTERMAN, AND EBENEZER WILDER, OF NEW CASTLE, PENNSYLVANIA.

MACHINE FOR MAKING SPIKES.

Specification of Letters Patent No. 9,902, dated August 2, 1853.

*To all whom it may concern:*

Be it known that we, JOHN R. RICHARDSON, JAMES WESTERMAN, and EBENEZER WILDER, of New Castle, in the county of Lawrence and State of Pennsylvania, have invented certain new and useful Improvements in Machines for Making Spikes; and we do hereby declare that the following is a full, clear, and exact description of the construction and operation of the same, reference being had to the annexed drawings, making a part of this specification, in which—

Figure 1, is a top or plan view of our improved machine. Fig. 2, is a side view of ditto, the side pieces of the frame nearest the eye being removed. Fig. 3, is a perspective view of the cam, by which the header and pointing rollers are operated. Fig. 4, is a section showing the gripping jaws, as being closed, and the printing rollers moved the extreme length of their vibration, and the point of the spike formed.

Similar letters of reference indicate corresponding parts, in each of the several figures.

The nature of our invention consists, 1st, in a peculiar manner of forming the point of the spike viz, by means of rollers in combination with broad dies resting against their disks; the rollers being attached to slides or carriages, which work on adjustable beds; the beds being placed more or less oblique, with the spike, and consequently a long or short point, whichever is desired, given the end of the spike, as the carriages are moved and the rollers pressed against it. This will be fully described hereafter. 2nd, in giving to the header when the spike is completed a very slight return motion before the jaws are separated, this motion being barely sufficient to relieve the jaws from the pressure of the head of the spike, but still leaving the head in the header while the jaws are opening, and being withdrawn from the spike, so that when the header is finally withdrawn the spike being cleared from the header and jaws will fall out of the machine the header thus performing the duty of a clearer. 3rd, in the combination of a holder of peculiar construction with the guiding and cutting loop, the punch, the under die, and movable jaw, for the purpose of holding the spike blank against the said die and jaw while it is being cut off from the rod, and carried over to the stationary jaw. By these means I am enabled to cut off the spike at its head end, without loss of time, and at a sufficient distance from the ends of the dies and jaws to leave material outside thereof to form the head. 4th, also in connecting the gage against which the rod is fed with the pointing carriage, so that when the point is being made the gage will be carried away, and the point permitted to elongate without any separate motion of the gage.

To enable others skilled in the art to make and use our invention, we will proceed to describe its construction and operation.

A, represents the frame of the machine, on one end of which there is a shaft, B, supported by uprights, C, C. On this shaft, B, there are placed five cams, D, E, F, G, H, which, as the shaft rotates, communicate motion to the working or moving parts of the machine. The cam, F, placed at about the center of the shaft, B, works the lever, I, the lower end of which is attached to a rock shaft, J, having its bearings under the upper side pieces of the frame, see Fig. 2; the bearings are not represented, but the exact position of the rock shaft is shown. The upper end of the lever, I, is made to bear against the cam, F, by means of the spring, K.

To the lever, I, is attached a jaw, L, an under die, M, a roller-carriage, N, and its bed, O. The jaw, L, is merely a horizontal metal plate; and the under die, M, is secured to its outer end, a short distance below its upper edge. P, is also a jaw, secured permanently to a stationary stock, Q, directly opposite the jaw, L. The stationary jaw, P, is precisely similar to the jaw L. These jaws seize the spike back of the part on which the pointers act.

The upper and lower dies, near the point end of the blank, are made wide, as will be seen in the drawings, wider than the blank, and spreading out over a portion of the disks of the pointing rollers and resting thereon during the operation of pointing. The blank is compressed by the dies to the precise thickness of the pointing rollers before the rollers move to give the point. These dies resting above and below against the disks of the pointing rollers form, as it were, grooves for the rollers to work in, against the sides of the blank; and as the dies rest upon the disks there is no space between the dies and disks for the formation of a fin, or feather upon the spike—whereas if the dies were narrow or did not rest on the rollers the rollers would cause the blank to spread while the point is forming, producing fins and ruining the spike, a defect which has hithertofore rendered roller-pointers worthless. Die pointers cannot produce long points for ship spikes, and as the rollers have failed in consequence of the fins, &c., the points of such spikes have hitherto generally been made by the hand hammer, or sometimes means have been taken to remove the pins. But the difficulties are all obviated by our construction of the dies in combination with the rollers for pointing.

To the stationary stock Q is secured a bed, R, on which a carriage S, works. The bed and carriage on the lever are precisely similar to the bed and carriage on the stationary stock, Q.

T, T, are rollers, placed in the sides of the carriages, that face each other. These rollers are distinctly seen in Figs. 1, 2, and 4.

U, is a holder, attached to a vibrating arm, V, having its fulcrum or pivot, (a), secured to the lever, I. The holder, U, is bent at its outer end to fit the blank, and presses upon it on two sides, and retains or holds it upon the under die, M, and against the jaw L, while the spike is being cut the required length. The vibrating arm, V, is connected to a spring, W, by a rod, X; the spring, W, being operated by the cam, D, to raise it when the spike blank has been cut and carried against the jaw P.

Y, is a lever, having its fulcrum at Z, and operated by the cam, E. An upper die, A', is attached to this lever Y; the upper die pressing upon the spike directly over the rollers, T, T, when the jaws grip the blank. This die is in two parts with a space between to allow the holder to rise when the blank is gripped.

B' is a header attached to a shaft, C'. The header is constructed in the usual way, having a recess in its end, to form the head of the spike.

D', D', are toggles, connected to the carriages, N, S, and by arms to the shaft, C'.

E' is an arm the lower end of which is connected to the shaft, C', and the upper end bears against the cam, H, by means of the spring, F'.

G', is a guide, having a loop, (b) at one end, through which the rod of which the spikes are formed, is passed. Against and across the end of this loop, or on its outer edge, a knife, H', works; said knife passing over the outer edge of the loop, and cutting off the rod. The knife, H', is attached to a lever, I', which is operated by the cam, G; the lever, I', being pressed against the cam, by means of the spring, J'; see Fig. 1. The cutter while operating has the same motion with the jaw L and under die M, the blank is thus carried over uniformly.

The several parts being now described, we will proceed to describe the operation. The rod of which the spikes are formed is passed horizontally through the loops, (b), and upon the under die, M, and is stopped at the desired point by a gage, (c), connected with the pointing carriage. Motion being given the shaft, B, the cams, F, G, operate simultaneously upon the levers, I, I', and the knife, H', passes over the outer end of the loop, and cuts off the rod; a space being left between the outer end of the loop and the ends of the jaws, in order that a sufficient length of rod may be left to form the head of the spike the movable jaw or under die moving with the knife. When the knife, H', begins to cut the rod, the holder, U, is pressed down upon it, and holds it firmly against the under die, M and jaw L; the holder being operated by means of the cam, D, operating upon the spring, W. When the rod is cut off by the knife, H', the cam, G, has reached its highest point. The cam, F, still operates upon the lever, I, and continues to force the jaw, L, and carriage, N, with its roller, toward the stationary jaw and roller, until the spike, or rather the piece of rod of which the spike is to be formed is pressed between the two jaws, L, P. The holder, U, now rises, and the movable upper die, A', descends, and presses firmly upon the piece of rod; and also upon the upper sides of the pointing rollers the lever, Y, to which the die, A', is attached, being operated upon by the cam, E. The cam, H, now acts upon the lever, E', and the shaft, C', is turned in a direction toward the jaws, and the toggles, D', D', move the carriages, N, S, with the rollers, T T. The rollers bearing or pressing against the rod, and being moved toward its end, form the point of the spike, because the beds, O, R, of carriages, are set oblique with the rod, (see dotted lines in Fig. 1,) and the rollers, as the carriages are moved, are brought gradually near together, till they come near or quite in contact the gage moving with the carriage out of the way of the point. It will be seen that, by placing the beds more or less oblique, a long or short point may be obtained. The header, B', is also moved simultaneously with the carriages, and the header presses against the end of the rod, and forms the head of the spike. The header then recedes, or moves back a little, in order that the head of the bolt may not be pressed against the ends of the jaws, and prevent them from parting but still retaining the head freely. This is accomplished by the peculiar shape of the cam, H; see Fig. 3. When the highest point of the cam has acted upon the lever, E', the lever, as the cam moves, falls on a slightly depressed part of the cam $d$ which continues for some distance; and the header, B', consequently slightly recedes or is moved back sufficiently to relieve the jaws, but retains the head until the die and jaw are removed from the shank. After the point of the spike is formed, the levers, I I', are moved back, their cams having passed their highest points, and the jaw, L, and carriage, N, are consequently parted or moved from the stationary ones; the upper die, A', is also moved upward. The spike, being completed, and the header withdrawn it falls between the two jaws, and the several parts, above described, are again ready for operation.

We do not claim any peculiarity of the jaws, nor the manner in which the movable jaw is operated; for these are well known devices, and have been previously employed; but

Having thus described the nature and operation of our invention, what we claim as new, and desire to secure by Letters Patent, is—

1. The manner of forming the point of the spike, substantially as herein shown and described, viz., by means of the combination of the wide dies resting on the disks of the rollers and the pointing rollers, arranged and operating substantially as set forth.

2. We claim slightly withdrawing the header after the head is completed, for the purpose of relieving the jaws from its pressure before they begin to open, and holding it in that position with the spike head therein, until the jaws are opened and the movable jaw and die are nearly or quite withdrawn from the spike then withdrawing the header to its farthest position from the dies, allowing the spike to fall—thus causing the header to perform the duty of a cleaver—substantially as described.

3. We claim the combination of the cutting guide loop, the cutter, and the holder, as constructed and operating, with the movable jaws and movable die for the purpose of cutting off the blank at sufficient distance from the ends of the dies to leave material for the head, and carrying it over to the stationary jaw at the same operation, substantially as described.

4. We also claim attaching the gage firmly to the carriage of the pointing rollers, so that it will be withdrawn as the point is drawn out by the rollers, and returned to its position when the pointers are withdrawn without any other mechanism to actuate it, as described.

J. R. RICHARDSON.
JAMES WESTERMAN.
EBENEZER WILDER.

Witnesses:
Jas. Dickson,
Marcus Mann.